Figure 1:
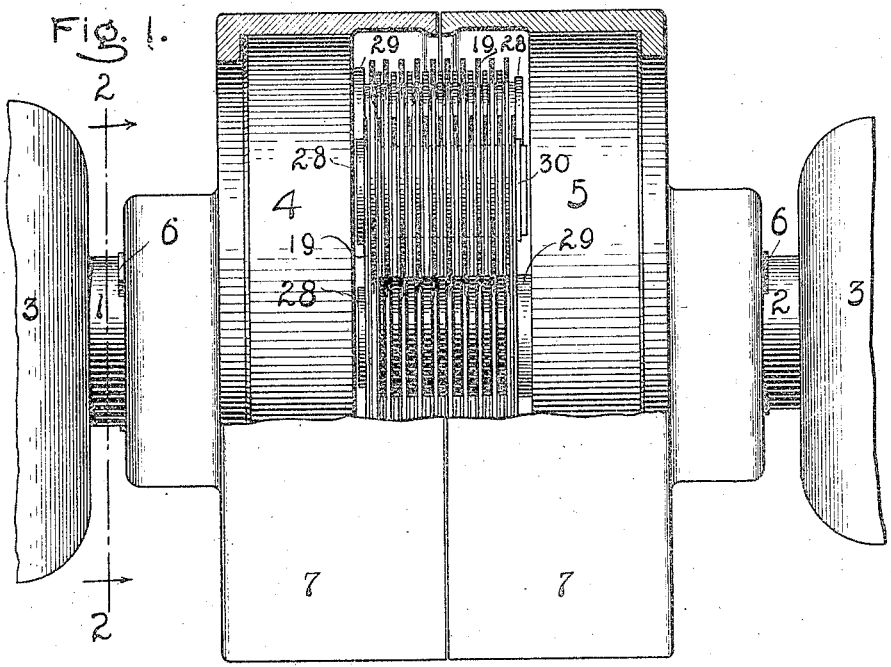

J. G. CALLAN.
FLEXIBLE COUPLING.
APPLICATION FILED OCT. 21, 1905.

1,091,809.

Patented Mar. 31, 1914.
3 SHEETS—SHEET 1.

Witnesses:
M. G. Crozier.
Helen Oxford

Inventor,
John G. Callan,
By Albert G. Davis
Att'y.

J. G. CALLAN.
FLEXIBLE COUPLING.
APPLICATION FILED OCT. 21, 1905.

1,091,809.

Patented Mar. 31, 1914.
3 SHEETS—SHEET 2.

Witnesses:
M. G. Crozier
Helen Oxford

Inventor,
John G. Callan,
By Albert G. Davis
Atty.

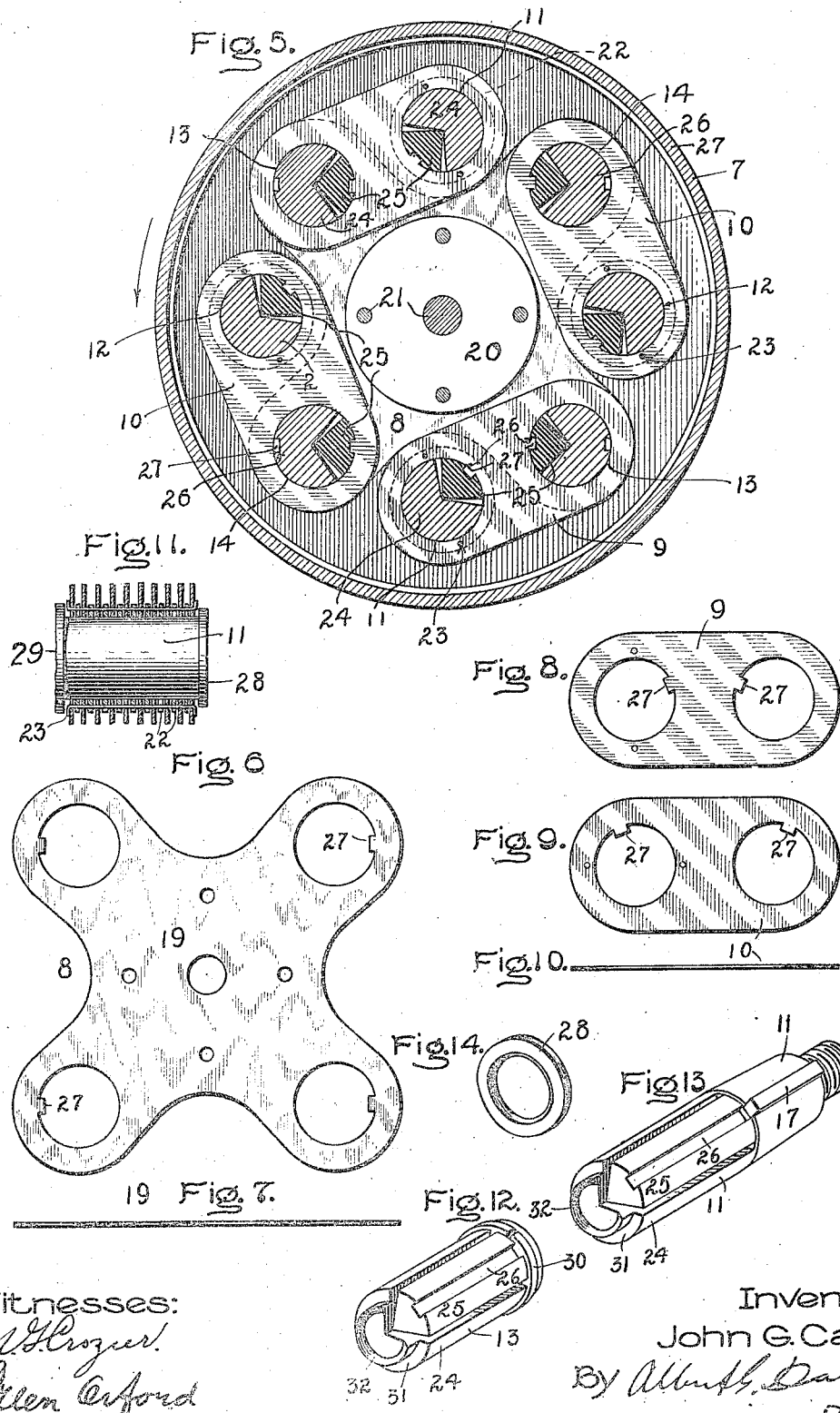

UNITED STATES PATENT OFFICE.

JOHN G. CALLAN, OF LYNN, MASSACHUSETTS, ASSIGNOR TO GENERAL ELECTRIC COMPANY, A CORPORATION OF NEW YORK.

FLEXIBLE COUPLING.

1,091,809.  Specification of Letters Patent.  Patented Mar. 31, 1914.

Application filed October 21, 1905. Serial No. 283,736.

*To all whom it may concern:*

Be it known that I, JOHN G. CALLAN, a citizen of the United States, residing at Lynn, county of Essex, State of Massachusetts, have invented certain new and useful Improvements in Flexible Couplings, of which the following is a specification.

This invention relates to flexible shaft couplings and has for one of its objects to provide a coupling of improved construction which will effectually compensate for discrepancy in alinement of the shafts or for deflection of one shaft from axial coincidence with the other, due to slight inaccuracies in the bearings or in the shafts themselves, or in both, and which will also permit of slight relative end-play between the shafts, where such provision is desirable, as in direct-connected electrical machines employing brushes, so as to prevent grooves from being worn in the commutator or collector rings.

A further object is to provide a coupling which is especially designed for use in connection with high speed apparatus, such for instance as turbo-generator sets, and is capable of operating without lubrication.

In carrying out the invention I provide disks which are adapted to be keyed to the adjacent ends of the driving and driven shafts and between the disks are arranged the members which constitute the flexible portion of the coupling. This flexible portion comprises a member, which I shall term a "floating connector," and links that connect it to the disks. The connector is or may be star or cross-shaped, and one set of links is arranged to connect two diametrically opposite arms of the connector to the driving disk of the coupling and the other set of links is arranged to connect the other arms with the driven disk. More than four arms may be employed if desired; in any case they are preferably displaced equidistant around the center. The links are attached to the disks by pivots which extend in an axial direction from adjacent surfaces thereof in overlapping relation and project into the spaces between the arms of the connector so as to reduce the radial dimension of the coupling and to obtain the best arrangement for the transmission of power from one member to another. The pivots between the links and arms of the connector and also those between the links and the disks are so constructed as to include a knife edge bearing so as to reduce frictional or bearing surfaces to a minimum, and hence obviate the necessity of lubrication. This I consider an important feature of the invention, as it renders the coupling applicable to high speed machinery without a more or less expensive arrangement for lubricating the bearing surfaces of the parts. With the members thus arranged, power is transmitted from the driving disk through one set of links to the connector and thence through the other set of links to the driven disk. The connector being supported merely by the links is free to assume any position in a plane transverse to its axis, in case of eccentricity of the shafts, and thus permit of disalinement without producing strains or cramping in the shaft bearings, while at the same time performing its intended function of transmitting power from the driving to the driven shaft.

In order to provide for relative end-play or longitudinal movement of the shafts and for angular disalinement or deviation from a co-axial and straight line relation of the shafts, I construct the floating connector, or the links, or both, so as to be capable of moving or flexing in the general direction longitudinal of the shafts. According to the preferred embodiment, the connector and links are each made of a suitable number of sheet metal plates or laminæ of the required resiliency. The plates of each member are suitably spaced apart so as to permit the plates of the links to interlap and loosely engage between those of the connector at the points of pivotal connection and thus afford flexibility. In addition to this freedom of play between the plates or laminæ, the plates themselves are capable of flexing in a more or less axial direction.

For an understanding of the details of construction and of the features of novelty, reference is to be made to the following description, and to the claims appended hereto.

Figure 2:
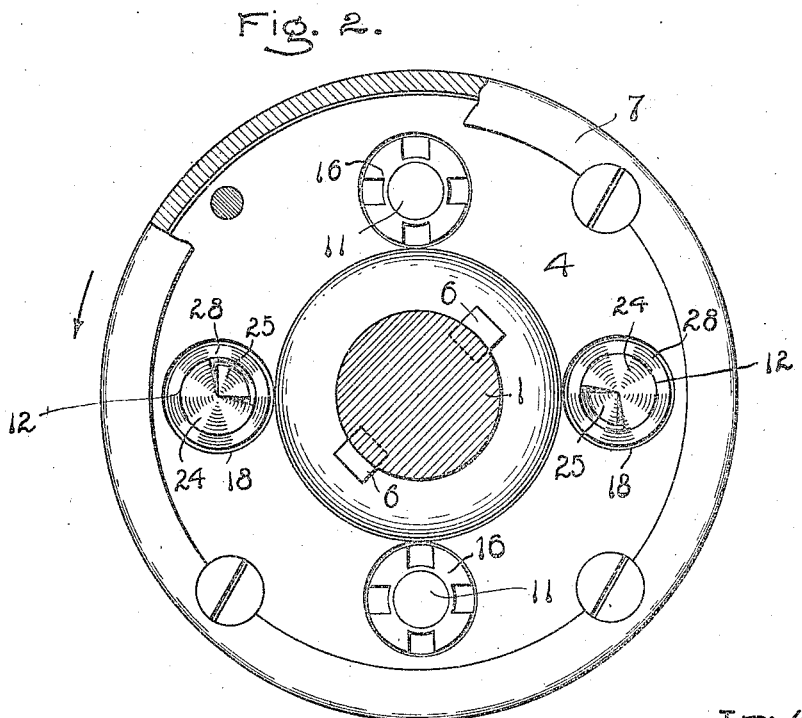
Figure 3:
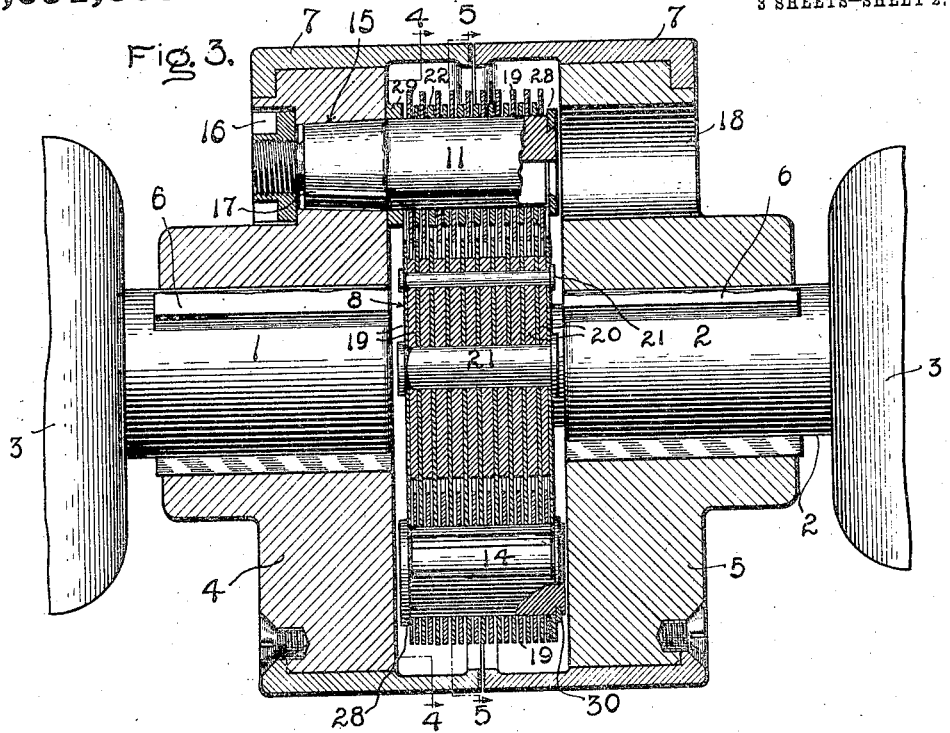
Figure 4:
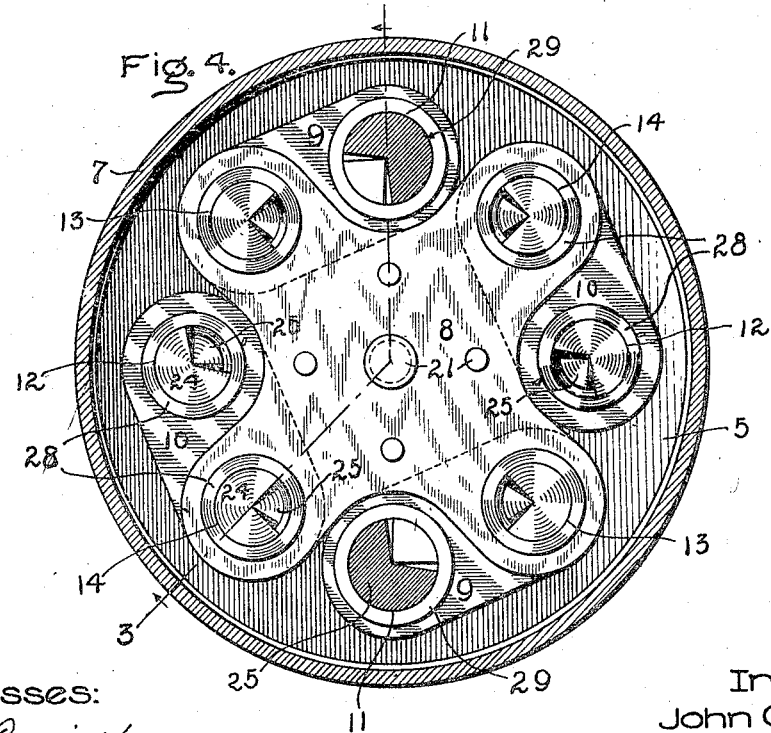

In the accompanying drawings which illustrate one embodiment of the invention, Figure 1 is a plan view of the coupling with portions of its inclosing casing broken away; Fig. 2 is a transverse section on line 2—2 of Fig. 1 looking in the direction of the arrows; Fig. 3 is a longitudinal section on line 3—3 of Fig. 4 looking in the direction of the arrows; Figs. 4 and 5 are transverse sections taken respectively on lines 4—4 and 5—5 of Fig. 3 and looking in the direction of the arrows; Figs. 6 and 7 are, respectively, a plan and an edge view of one of the laminæ of the floating connector; Fig. 8 is a plan view of one of the laminæ of the links connecting the driving disk of the coupling with the connector; Figs. 9 and 10 are, respectively, a plan and an edge view of one of the laminæ of the links connecting the driven disk with the connector; Fig. 11 is a section through one of the links showing a retaining means for the laminæ and their spacers; Figs. 12 and 13 are detail views of the pivots of the coupling showing the knife edge bearings, and Fig. 14 is a view of the retaining ring for the pivots.

Referring to the drawings, 1 and 2 represent respectively, a driving and a driven shaft which are mounted in suitable bearings indicated at 3. On the shafts are arranged coupling disks 4 and 5 which are secured thereto in any suitable manner as by keys 6. Extending around the disks are cylindrical members 7 which project beyond the adjacent surfaces of the disks so as to overhang the members that constitute the flexible portion of the coupling and form a housing or casing therefor. These cylindrical members 7 may be formed integral with the disks, or separate therefrom and secured to them in any suitable manner. The flexible portion of the coupling comprises a floating connector 8 and links 9 and 10 which connect it by means of pins or pivots 11 and 12 to the disks 4 and 5, respectively. The connector is preferably cross-shaped and the links 9 and 10 are connected to the arms thereof by pivots 13 and 14, respectively, Figs. 4 and 5. The pivots 11 and 12 are mounted on their respective disks at a hundred and eighty degrees apart and the pivots of one disk are displaced ninety degrees from those of the other disk, and overlap the same in a transverse plane. They project from adjacent sides of the disks into the spaces between the arms of the connector and are disposed in a circle common to the pivots 13 and 14 in the arms of the connector, assuming the shafts to be concentric and the parts in normal position. By this arrangement, the dimension of the coupling is reduced to a minimum and the parts confined within a small space, while at the same time the links are disposed in the most desirable position for transmitting power to and from the disks and the connector.

The pivots 11 and 12 are tapered to fit in correspondingly shaped sockets 15 in the disks, Fig. 3, and the tapered ends are reduced in diameter and threaded so as to receive crown nuts 16 which serve to hold the pivots in place. In order to prevent rotation of the pivots, keys 17, Figs. 3 and 13, are employed. The disks are provided with openings 18 at points in line with each of the pivots through which the latter may be inserted in place or withdrawn when connecting or disconnecting the parts of the coupling.

The connector and the links are made up of a number of sheet metal plates or laminæ. As shown in Figs. 4 and 6, the plates 19 of the connector are cross-shaped and stamped with holes in their arms for receiving the pivots 13 and 14. Intermediate the plates are spacers 20 (Figs. 3 and 5) which are somewhat greater in thickness than the plates of the links so as to permit free-play between the latter plates and those of the connector on the pivots 13 and 14. The spacers are arranged at the central portion of the connector, between inner ends of the arms of the plates so as to leave spaces or interstices into which the plates of the links extend. The plates and spacers are rigidly secured together by means of rivets 21 arranged in any suitable manner. With this construction the body portion of the connector forms a solid structure possessing the desired rigidity, while the arms are rigid in the plane of the laminæ or in the plane of rotation and still possess the required flexibility to permit relative deflection between the shafts, or slight end-play.

Between the plates of the links at the ends connected with the pivots 11 and 12 carried by the disks are loosely arranged spacers or washers 22 (Figs. 3 and 11) which serve to maintain parallel relation between the plates. They are of such thickness as not to completely fill the spaces between the plates of the links so that the plates may also have individual movement on the pivots. In order to maintain the washer 22 in proper relation to the plates of the links when the pivots 11 and 12 are removed from the disks in case of disassembling parts of the coupling small tie-rods or retainers 23 are employed (Fig. 11) which extend through registering openings in the washers and plates and are turned over at their ends or otherwise fastened. These retainers are long enough to permit the necessary freedom of movement between the plates of the links.

In order to reduce friction between relatively movable parts and also to avoid the use of lubricant, the pivots between the connector and the links and between the links and the disks are made in two parts with a knife edge bearing between them (Figs. 5, 12 and 13). The portion 24 of each pivot is slotted longitudinally to form a seat for the knife edge or other portion 25. The seat is sector-shaped in cross-section and its walls are disposed at an angle of preferably more than ninety degrees. The knife edge is also sector-shaped in section and has a radius equal to that of the portion 24 so that the two will snugly fit the pivot holes in the connector and links. The angle of the knife edge surfaces is somewhat less than the angle between the radial walls of the seat so as to provide ample clearance to permit the knife edge to move freely in the latter.

In the cylindrical surface of each portion of the pivots (except the seat portions of the pivots 11 and 12), Figs. 5, 12 and 13, are provided longitudinal keyways 26 which receive keys that secure the links to the knife-edge portions and the connector to the seat portions. The keys are preferably lugs 27 formed integral with the plates or laminæ of the links and connector, (Figs. 6, 8 and 9). By this arrangement the knife-edge portions of the pivots form a rigid part of the links as regards movement in the plane transverse to the axes of the shafts. A limited movement of the laminæ of the links, however, is permitted axially of the knife-edges to provide for endwise movement of the shafts. The bearing portions of the pivots 13 and 14 are also rigidly connected with the connector, while the laminæ thereof are movable in the same sense mentioned in connection with the links. Thus the relative changes in position of the disks, links and connector, which attend rotation in case of eccentricity of the shafts, all take place around the knife-edges so that there is little or no friction between the parts of the coupling.

Referring to Fig. 5, it will be observed that the knife-edge portion of the pivots bear a definite relation to the seat portion. The seat portions 24 of the pivots 11 carried by the driving disk 4, or those shown at the top and bottom of the figure, transmit power through the knife-edge portions 25 to the links 9, which latter in turn act through the knife-edge portions of the pivots 13 to transmit power to the connector through the seat portions of the same pivots. Power is next transmitted by the connector through the links 10 to the driven disk 5. The seat portions of the pivots 14 of the links 10 act through the knife-edge portions to impart power to the links 10, which in turn act through the knife-edge portions of the pivots 12 to transmit power to the seat portions thereof and thence to the driven disk. The force acting through the links 9 is one of compression and that acting through the links 10 is one of tension.

The knife-edge portions 25 are retained in their seats and the movement of the laminæ on the pivots is limited by rings 28 (Figs. 3, 11 and 14) which are secured on the ends of the seat portions to form retainers. On the pivots 11 and 12 are collars 29 (Fig. 3) arranged between the disks 4 and 5 and the outside laminæ of the connector, which coöperate with the rings 28 to limit the movement of the laminæ on the pivots incident to endwise movement of the shafts. The seat portions of the pivots 13 and 14 (Figs. 3 and 12) are each provided with a shoulder 30 formed preferably by a split ring seated in an annular groove and which serves the same function as the collar 29. The rings 28 are secured in place by riveting the ends of the seat portions. The ends are first reduced in diameter to form a shoulder 31, Figs. 12 and 13, against which the ring bears, and the end is slightly countersunk, leaving a flange 32. The ring is also slightly countersunk so that when assembled on the reduced end, the flange can be riveted into the countersunk portion of the ring to form a flush surface, as shown in Fig. 3.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A coupling for shafts comprising a driving and a driven member, a laminated resilient floating connector between the members which is flexible in a direction to permit of a limited endwise movement of the shafts, and flexible laminated links pivotally connecting the members with the connector, the laminæ of the links and connector interlapping and extending transversely of the shafts.

2. A coupling for shafts comprising a driving and a driven disk, a floating connector between the disks which is formed of spaced laminæ provided with flexible radial arms, spacing members between the laminæ, and links pivotally connecting the outer ends of the arms with the disks which extend into the spaces between said laminæ.

3. A coupling for shafts comprising a pair of flanged members, a resilient laminated floating connector between them, resilient laminated links pivotally connecting the members and the connectors which are flexible in a direction to permit endwise movement of the shafts, and pivots connecting the links to said members and the connector, said pivots including a knife-edge bearing.

4. A coupling for shafts comprising a driving and a driven element, a floating member located between the elements, and comprising a plurality of thin disks, spacers between the disks and means for uniting the disks and spacers, a plurality of links for uniting the floating member and the elements, each link comprising a plurality of thin plates extending freely between said disks, pivots that unite the links with the elements, and other pivots that unite the links and said member.

5. A coupling for shafts comprising a driving and a driven element, a floating member located between the elements, and comprising a plurality of thin disks, spacers between the disks and means for uniting the disks and spacers, a plurality of links for uniting the floating member and the elements, each link comprising a plurality of thin plates extending freely between said disks, spacers between the individual members of each link, and pivots which unite the links with the floating member and with said elements.

6. A coupling for shafts comprising two rotating elements, a laminated cross-shaped member, and laminated links connected with the elements and the member, the laminæ of the links and the member interlapping and extending in a plane transverse to the axis of rotation.

7. A coupling for shafts comprising two rotating elements, a floating connector formed of laminæ with spaces between them, and laminated links connected with the elements and the connector whose laminæ extend into the spaces between the laminæ of the connector.

8. A coupling for shafts comprising two rotating elements, pivots or pins extending from adjacent portions of the elements, a laminated member disposed between the elements and adjacent the inner sides of the pivots, laminated links connecting the member with the pivots, and pivots between the links and the member.

9. A coupling for shafts comprising two rotating elements, a laminated floating connector, spacing devices between the laminæ of the connector, laminated links connecting the connector to the elements, the laminæ of the links interlapping between the laminæ of the connector, and pivots at the points of connection of the links with the elements and the connector, said pivots each including a knife-edge bearing.

10. A coupling for shafts comprising a driving and a driven disk, a floating connector between the disks which is formed of spaced laminæ, spacing devices between the laminæ, pivot pins mounted in the disks and other pivot pins mounted in the connector, links connecting the pivot pins which extend into the spaces between said laminæ, the connections between the links and the pins including knife-edge bearings.

11. A coupling comprising a driving and a driven disk, a laminated floating member located between the disks, laminated links whose ends extend between the laminæ of the member, pivots connecting the interlapping portions of the member and links, each pivot comprising a knife edge portion keyed to one part and a seat portion keyed to the other part, means on the seat portions for retaining the laminæ on the pivots, and other pivots connecting the other ends of the links with the disks.

12. A coupling comprising a driving and a driven disk, a laminated floating member located between the disks, laminated links, and pivots connecting the links with the member and with both of said disks, each pivot comprising a knife edge portion and a seat portion, key ways on said portions, and keys formed integral with the laminæ of said member, and links for securing one of said parts to the knife edge and the other to the seat portion of the pivot.

13. In a coupling of the character described, driving and driven members, a floating connector pivotally connected to said members comprising star shaped laminæ, and spacing members secured between adjacent laminæ.

14. In a coupling of the character described, the combination of driving and driven elements, a member formed of laminæ having radial arms which are resilient in a direction along the axis of the coupling and rigid in a direction transverse thereto, means for spacing the laminæ apart, and laminated links pivotally connecting the member and said elements whose laminæ extend into the spaces between the laminæ of said member.

15. In a coupling of the character described, the combination of a laminated member, a pivot, spacers on the pivot which are loosely arranged between the laminæ of the member, and means for retaining the spacers and laminæ in operative relation when the pivot is removed.

16. A coupling for shafts comprising two rotating elements, a laminated member flexibly connected between them, and laminated links connecting the elements and the member, the links and member lying in a common plane and the plane of lamination being transverse to the axis of rotation so as to permit of relative end movement of the shafts.

In witness whereof, I have hereunto set my hand this eighteenth day of October, 1905.

JOHN G. CALLAN.

Witnesses:
JOHN A. McMANUS, Jr.,
HENRY O. WESTENDARP.